(12) United States Patent
Baumgart et al.

(10) Patent No.: US 6,246,543 B1
(45) Date of Patent: Jun. 12, 2001

(54) TEXTURED DATA STORAGE DISK HAVING A BRITTLE NONMETALLIC SUBSTRATE

(75) Inventors: Peter Michael Baumgart, San Jose; Wing Pun Leung, Arcadia; Hung Viet Nguyen; Thao Anh Nguyen, both of San Jose; Andrew Ching Tam, Saratoga; Anthony Wu, San Jose, all of CA (US)

(73) Assignee: International Business Machines Corporation, Armonk, NY (US)

( * ) Notice: Subject to any disclaimer, the term of this patent is extended or adjusted under 35 U.S.C. 154(b) by 1133 days.

(21) Appl. No.: 08/714,831

(22) Filed: Sep. 17, 1996

Related U.S. Application Data

(63) Continuation of application No. 08/474,538, filed on Jun. 7, 1995, now abandoned, which is a continuation of application No. 08/149,851, filed on Nov. 10, 1993, now abandoned.

(51) Int. Cl.[7] ................................................. G11B 5/82
(52) U.S. Cl. ............................................................ 360/135
(58) Field of Search ............................................. 360/135

(56) References Cited

U.S. PATENT DOCUMENTS

| | | | |
|---|---|---|---|
| 4,985,306 | 1/1991 | Morizane et al. | 428/410 |
| 5,062,021 | 10/1991 | Ranjan et al. | 360/135 |
| 5,079,657 | 1/1992 | Aronoff et al. | 360/103 |
| 5,108,781 | 4/1992 | Ranjan et al. | 427/53.1 |
| 5,143,578 | 9/1992 | Luthi | 156/643 |
| 5,162,073 | 11/1992 | Aronoff et al. | 156/625 |
| 5,236,763 | 8/1993 | Luthi | 428/156 |

FOREIGN PATENT DOCUMENTS

| | | | |
|---|---|---|---|
| 0511622 | * 11/1992 | (EP) | 360/135 |
| 4-028012 | * 1/1992 | (JP) | 360/135 |
| 4-311814 | 11/1992 | (JP) . | |

* cited by examiner

*Primary Examiner*—Robert S. Tupper
(74) *Attorney, Agent, or Firm*—Altera Law Group, LLC

(57) ABSTRACT

A magnetic recording disk with a glass substrate is textured by a process which creates an array of bumps in a magnetic head contact start and stop (CSS) region of the disk. The texturing process uses a laser to provide pulses of predetermined energy fluence on the glass substrate to produce a plurality of raised bumps in the substrate surface, each bump having a surface elevation controllable to within a few nanometers. The bumps are created without unwanted micro-cracking or ejection of surface material by exploiting a narrow operating region below the abrupt thermal shock fluence threshold of the glass substrate. This textured glass substrate provides the magnetic recording disk with improved stiction, wear, coatability and sensor flying height properties.

29 Claims, 4 Drawing Sheets

TEXTURED DATA STORAGE DISK HAVING A BRITTLE NONMETALLIC SUBSTRATE

This application is a continuation of application Ser. No. 08/474,538, filed Jun. 7, 1995, now abandoned, which was a PVC of abandoned parent case Ser. No. 08/149,851, filed on Nov. 10, 1993 now abandoned.

This disclosure is related by common inventorship and subject matter to patent application Ser. No. 08/150,525 filed on even date herewith, entitled A MAGNETIC RECORDING DISK HAVING A LASER-TEXTURED SURFACE, which is entirely incorporated herein by this reference.

BACKGROUND OF THE INVENTION

1. Field of the Invention

This invention relates generally to processes for texturing data storage disk substrates and specifically to a highly controllable laser texturing process for brittle nonmetallic surfaces such as a glass substrate for a data storage disk.

2. Description of the Related Art

Recent magnetic disk drive designs employ a commonly denominated Contact Start-Stop (CSS) system in which the magnetic head contacts the magnetic disk surface when the disk is stationary. When the disk starts to rotate, the magnetic head slides along the surface, eventually flying fully lifted from the surface because of laminar air flow at the disk surface.

A smooth, specular recording surface is preferred in the art to permit the magnetic head to ride as closely as possible to the disk surface. Creation of a "textured" region on the metallic disk surface for magnetic head contact during CSS is used in the art to overcome the excessive contact stiction and friction developed during startup and stopping of disk rotation. The magnetic head is moved to the "CSS region" at the appropriate times by the drive controller. The specular smoothness of the remainder of the disk surface is retained to permit high-density magnetic data recording.

Practitioners in the art have proposed several useful techniques for texturing metal disk surfaces. For instance, the use of repetitive laser pulses to create reproducible pits on a metal surface is known in the art for application to sheet-metal stamping surfaces, liquid transfer surfaces and metal data storage disk surfaces, as discussed in the above-cited co-pending patent application. Unfortunately, such techniques are not generally useful for texturing of brittle nonmetallic disk substrate surfaces such as the glass substrate known in the art for certain data storage disk applications. A brittle nonmetallic surface, especially a glass surface, is expected to crack or deform excessively during the grinding or laser texturing techniques known in the art for metal disk substrates. Accordingly, chemical surface texturing techniques and other patterned deposition techniques are preferred in the art for brittle surfaces such as ferrite or glass.

For instance, in U.S. Pat. Nos. 5,079,657 and 5,162,073, Michael I. Aronoff et al. disclose a selective chemical etching technique for texturing the flying surface of a magnetic head. Aronoff et al. teach a stiction-reducing approach that avoids the necessity of texturing a CSS region on the recording disk but is disadvantageously limited to specific head surface materials.

In U.S. Pat. No. 4,985,306, Toshinori Morizane et al. disclose a method for manufacturing a glass base plate for a recording disk that includes subjecting the base plate to chemical etching treatments that provide different rates of etching between a crystallized material and an amorphous material. Morizane et al. teach the use of their method for creating a textured CSS region in the base plate that is reproduced through a subsequently-deposited recording material layer. Other practitioners have suggested using expensive chemical vapor deposition (CVD) processes to create roughened zones on a glass disk surface before deposition of the magnetic recording film layer.

Some practitioners in the printing arts teach the use of laser pulses to create many tiny pits in the surface of a brittle material such as tungsten carbide. For instance, in U.S. Pat. Nos. 5,143,578 and 5,236,763, Pierre Luthi discloses a method for engraving a series of consecutive cells or pits in a solid surface such as the liquid transfer surface of a printing roller. Luthi recommends his technique to overcome the surface hardness of the ceramic and metal carbide surfaces normally used in engraving applications but neither considers nor suggests solutions to the particular problems of CSS region creation in brittle nonmetallic disk surfaces to overcome head stiction.

Others have considered the specific problem of using laser energy for reducing stiction in data recording disks having glass substrates. For instance, in Japanese patent 4-311814, Maeta Hiroshi discloses a technique for texturing the glass substrate without reducing surface durability by applying a laser pulse from the back of the translucent substrate to fracture and scatter small particles of glass at the front surface. The laser pulse induces thermal shock that effectively breaks up the front surface into fine grains that are then supposedly partially annealed to the front surface, creating a roughened topography suitable for reducing stiction in the magnetic recording film layer that is later added to the front glass substrate surface. Hiroshi doesn't discuss how his method overcomes the problems resulting from uncontrolled surface damage.

In U.S. Pat. Nos. 5,062,021 and 5,108,781, Rajiv Ranjan et al. disclose a process for creating a series of closely-spaced pits in the metallic surface of a magnetic recording disk to reduce stiction. Ranjan et al. teach the use of a flashlamp-pumped neodymium-yttrium-aluminum-garnet (Nd:YAG) laser to create the necessary surface roughness. However, they neither consider nor suggest the application of their texturing method to glass disk substrates or other brittle nonmetallic surfaces, and indeed their method is generally known to be impractical for brittle nonmetallic materials.

Practitioners in the art generally avoid using laser pulses to create controlled changes to the topography of a brittle nonmetallic surface, expecting hairline cracking or surface material damage. This damage, often at the microscopic level, is frequently observed after laser melting of any brittle nonmetallic material such as glass because of the rapid melting and resolidification caused by a short laser pulse. This rapid melting and resolidification usually causes excessive stress in the glass, which forces the surface to crack and break up. Such laser pulses are herein said to create stress that exceeds a "thermal shock threshold" for the brittle nonmetallic surface material. Indeed, the above-cited Hiroshi patent relies on this thermal shock micro-fracturing phenomenon for the usefulness of the claimed invention. Laser pulse energies below this threshold are generally believed to be useless for altering the topography of brittle nonmetallic surfaces.

Accordingly, there is a clearly-felt need in the art for a brittle nonmetallic surface texturing technique with the controllability and other advantages of the laser-texturing techniques known in the art for metal surfaces. The related unresolved problems and deficiencies are clearly felt in the art and are solved by this invention in the manner described below.

SUMMARY OF THE INVENTION

This invention solves the above problem by exploiting the unexpected discovery that high-reproducible bumps can be controllably made on a glass disk surface using single laser pulses of precisely-controlled energy fluence. Fluence control is required to exploit an unexpected comparatively narrow operating region just under the abrupt thermal-shock fluence threshold for the brittle nonmetallic material. Fluence control is accomplished using selected combinations of laser wavelength, pulsewidth and repetition rate combined with proper bump spacing to avoid overstressing of the laser irradiated region. The narrow operating fluence legion of this invention is bounded above by the thermal shock threshold and below by the melting or softening point of the material.

It is an object of this invention to create many microscopic bumps in a desired CSS region of a glass, ceramic or other brittle nonmetallic substrate surface to improve stiction, wear, friction, or coatability of such surfaces or to prepare the surface as a "stamping surface" mold for reproducing a negative impression. It is an advantage of the method of this invention that highly-reproducible microscopic bumps can be controllably created on a selected region of a surface using a pulsed laser.

It is another object of the method of this invention to avoid damage to the brittle nonmetallic surface caused by micro-cracking because of laser pulse heating. It is a feature and advantage of the method of this invention that laser pulse fluence is tightly controlled within a proper region just under the thermal-shock fluence threshold at which occurs such hair-line cracking of the glass surface and material ejection. This feature arises from the completely unexpected discovery that there is an abrupt transitional energy fluence threshold (the "thermal shock threshold") below which the laser pulse energy fluence either has no effect or merely creates a bump without damage. For a glass disk with compressive surface stress, such a bump unexpectedly protrudes almost entirely above the nominal surface, which is remarkably useful for reducing stiction in data storage disks.

The foregoing, together with other objects, features and advantages of this invention, will become more apparent when referring to the following specification, claims and the accompanying drawing.

BRIEF DESCRIPTION OF THE DRAWING

For a more complete understanding of this invention, reference is now made to the following detailed description of the embodiments as illustrated in the accompanying drawing, wherein.

DESCRIPTION OF THE PREFERRED EMBODIMENTS

Figure 1:
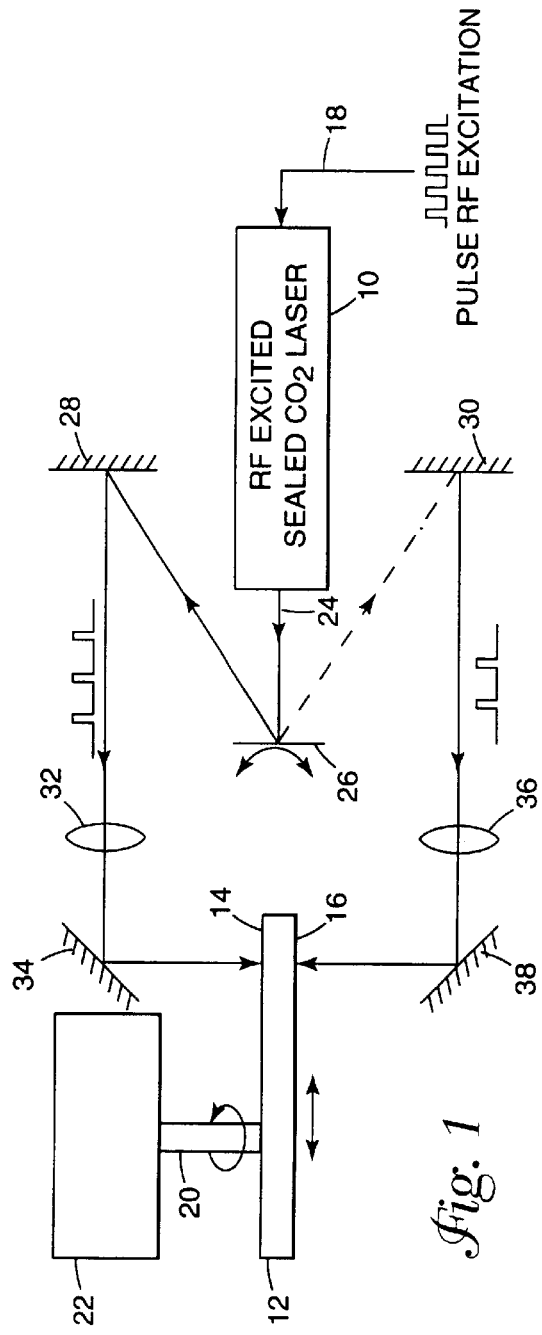
FIG. 1 is a functional schematic diagram of an exemplary apparatus for texturing a glass or other brittle nonmetallic surface in accordance with the method of this invention.

The process of this invention arises from the unexpected discovery that highly-reproducible, microscopic bumps can be controllably, inexpensively and quickly made on a glass disk surface using single laser pulses of the proper wavelength, pulsewidth and repetition rate combined with proper movement of the disk surface. FIG. 1 shows a functional schematic diagram of an exemplary apparatus suitable for implementing the process of this invention. This disclosure is primarily concerned with the texturing of glass storage disk substrates for reduced stiction, although the apparatus of FIG. 1 may be employed for creating a desired patterned area on glass, ceramic or other brittle nonmetallic substrate surfaces for purposes of reduced stiction, improved wear or improved coatability, or as a "stamping surface" for use in mass production of other surfaces imprinted with the negative of the stamping pattern. Thus, the process of this invention can be appreciated as having general applicability even though this disclosure is concerned with the texturing of glass disks for data-storage.

In FIG. 1, a pulsed laser 10 is chosen so that the optical penetration of the radiation incident on the glass disk substrate 12 is longer than 10 nanometers and shorter than one millimeter to produce effective "near-surface" heating of the glass substrate. The pulsewidth is chosen to be longer than one nanosecond and shorter than 100 milliseconds to provide efficient heating of the interaction volume without causing excessive thermal shock (below one nanosecond) or excessive volumetric heating through thermal-diffusion (above 100 milliseconds). The laser peak power and the focussed spot size on the two surfaces 14 and 16 of glass disk 12 are chosen for an "energy density" or "fluence" sufficient to provide gentle surface softening or melting over a short time period without causing the shattering and material ejection from surfaces 14–16 expected at higher fluence values.

Laser 10 is controlled by a pulsed radio-frequency (rf) excitation signal 18 to provide a pulse repetition rate that, when combined with proper translation and rotational movement of glass substrate 12, provides single laser-pulse action in a new target area on surfaces 14–16 each time the laser fires. This requirement is necessary to the process of this invention because it provides a wider operating range of fluences below the "thermal shock threshold" at which surface cracking and material ejection occurs. Although this "spaced-apart" target area requirement is preferred, the process of this invention may also be used for overlapping irradiation target spots but with a narrower acceptable operating range of fluences below the thermal-shock fluence threshold.

The operation of the apparatus in FIG. 1 is now described. Disk substrate 12 is rotated on a shaft 20 by means of a motor 22 and the entire motor-shaft assembly is translated radially by some useful translation means (not shown). In synchronism with disk rotation and translation, laser 10 is pulsed by signal 18 to provide the output pulses 24. Output pulses 24 can be split by deflection with a movable mirror 26 to either an upper stationary mirror 28 or a lower stationary mirror 30. Pulses 24 travelling along the upper path bounce off mirror 28 through a ZnSe focussing lens 32 to a stationary mirror 34 and therefrom to upper surface 14 of glass substrate disk 12. Similarly, pulses 24 along the lower path bounce off mirror 30 through the ZnSe focussing lens 36 to mirror 38 and therefrom to lower surface 16 of disk 12. Thus, with proper mechanical control of mirror 26, both sides 14 and 16 may be textured simultaneously.

In FIG. 1, the texturing at surfaces 14-16 is controlled by the combination of pulse energy, spot size, pulse rate, pulse width, disk rotation rate and disk translation rate. In addition to these control elements, the laser wavelength is selected to obtain the near-surface heating effect discussed above. It is an essential element of the process of this invention that the energy fluence at surfaces 14–16 is precisely controlled in a manner exemplified by the above discussion in connection with FIG. 1. This requirement is important because of the unexpected discovery that there exists a rather abrupt energy fluence "thermal-shock threshold level" for many brittle nonmetallic surfaces including glass. Above this threshold, the glass surface is at least partially shattered and material can be ejected. In much of the energy fluence region below the thermal-shock fluence threshold, energies are insufficient to create any topographical alteration to the brittle nonmetallic surface. The process of this invention exploits the heretofore unknown and relatively narrow fluence region properly below the thermal-shock threshold to create useful surface textures in brittle nonmetallic materials.

Figure 2B:
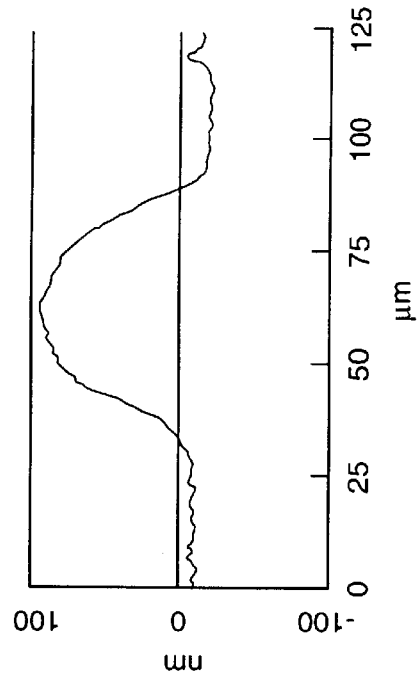
FIGS. 2A–2C show a typical surface bump array and bump profile obtained using the method of this invention.
Figure 2A:
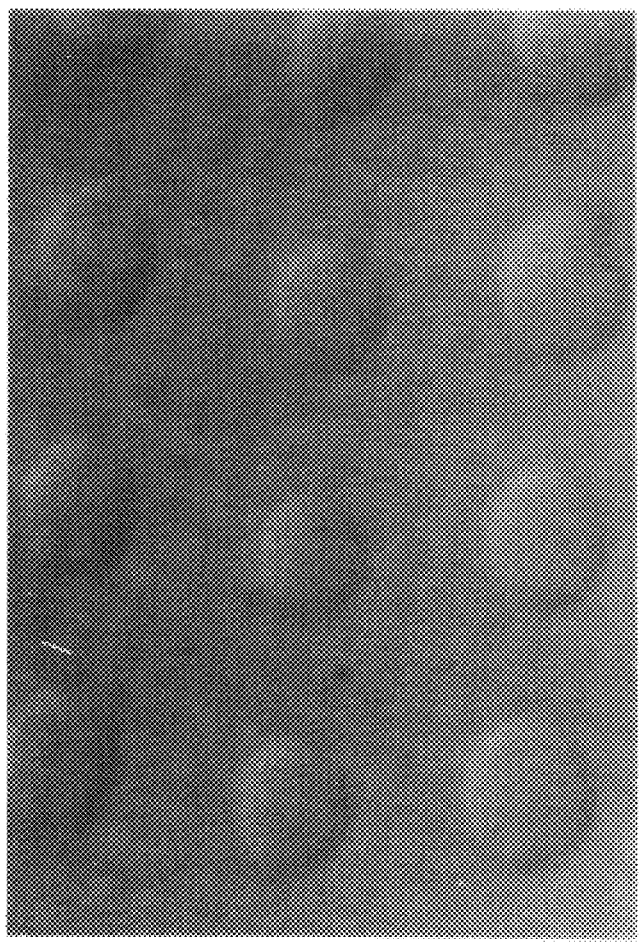
Figure 2C:
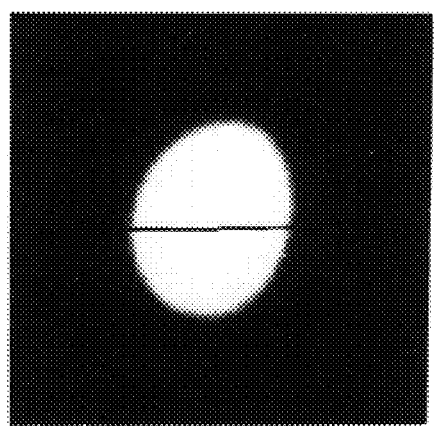

FIG. 2A shows the texture on a glass surface resulting from an exemplary combination of process parameters employed by the inventors to create a CSS zone on a glass recording disk substrate. The plurality of bumps in FIG. 2A characterizes the texture of this invention, showing each bump separated from its neighboring bump by a desired center-to-center separation distance $D_s$ of about 100 micrometers, which is in the preferred range of 1 to 500 micrometers. FIG. 2B shows the Atomic Force Microscope (AFM) profile measured along the path crossing the single bump shown in FIG. 2C. The profile in FIG. 2B is seen to have a maximum diametral dimension $D_d$ of substantially (90 minus 30)=60 micrometers, which is in the preferred range of 1 to 500 micrometers which is in the preferred range of 1 to 200 micrometers, and a maximum height $h_d$ of substantially 100 nanometers above the surrounding substrate surface plane, which is in the preferred range of 1 to 1,000 micrometers which is in the preferred range of 1 to 1,000 nanometers. The bumps are very smooth and ideally suited for reducing stiction in a CSS region of a data storage disk. Even with a protruding height $h_d$ of 100 nanometers for the bumps, no cracks or shattering is observed on the glass surface. Lower bump height, i.e. on the order of $h_d$ having some value in the interval from 3 to 40 nanometers, can be more desirable for CSS region texturing. These shorter bumps can be created by using lower laser fluences than those necessary for the 100 nanometer bumps. No cracking or shattering is produced during creation of such shorter bumps, either.

The following process parameters are herein disclosed as an example of an acceptable operating window providing energy fluence below the thermal-shock threshold for a glass surface:

laser wavelength, $\lambda_p$=10.6 micrometers;
laser pulse width, $t_p$=60 microseconds;
laser pulse peak power, $P_p$=12 watts;
focussed target spot diameter, $D_p$=200 micrometers;
pulse repetition rate, $F_p$=1500 Hertz;
disk rotational speed, $\omega$=4$\pi$ radians/second;
disk translational speed, $v_r$=200 micrometers/second; and
nominal center-to-center bump spacing, $D_s$=100 micrometers.

It should be appreciated that although the target area spot size $D_p$ is 200 micrometers, the bump size $D_d$ is only 30 micrometers for this fluence. This relationship illustrates the "threshold" characteristics of the laser texturing process of this invention that create a feature size much smaller than the radiated spot size. Without supporting evidence, the inventors hypothesize that the unexpected "fully-protruded" dimpling effect may result from a relaxation of surface stress caused by the laser-induced surface softening or by the laser-induced thermal expansion that "freezes-in" as the surface cools below the softening point.

Bumps of height $h_d$ from a few nanometers to as large as many micrometers can be produced by this technique of this invention. The inventors have demonstrated that larger bump heights can be produced through repetitive pulsing of the same target region spot without producing cracks, provided that the thermal shock threshold fluence level is not exceeded by any one pulse.

FIGS. 3A–3D illustrate the effects of exceeding the thermal-shock fluence threshold in a glass surface and also demonstrate the abrupt upper limit of the acceptable fluence operating region. Each of the surfaces in FIGS. 3A–3D were produced using the same operating parameters as are discussed above in connection with FIG. 2A, except for repetition rate ($F_p$=2,000 Hz instead of 1,500 Hz) and for pulse width $t_p$. Bump spacing in FIGS. 3A–3D is less than in FIG. 2A because of the increased repetition rate $F_p$.

Figure 3A:
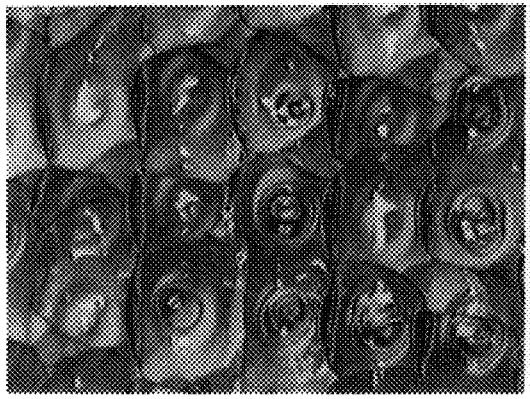
FIGS. 3A–3D show the surface texture of a glass substrate created in accordance with the method of this invention for four different fluence levels, two of which cause microcracking of the surface.
Figure 3B:
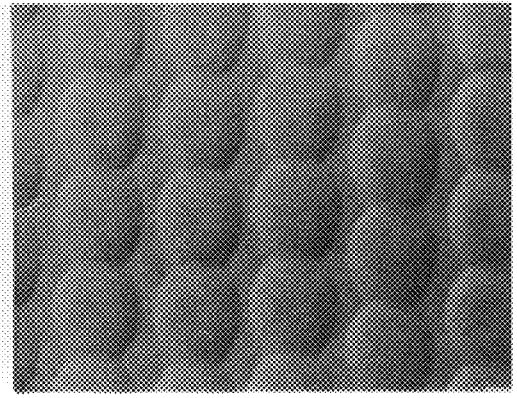
Figure 3C:
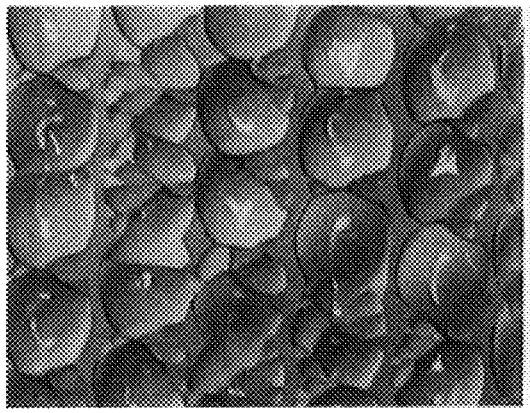
Figure 3D:
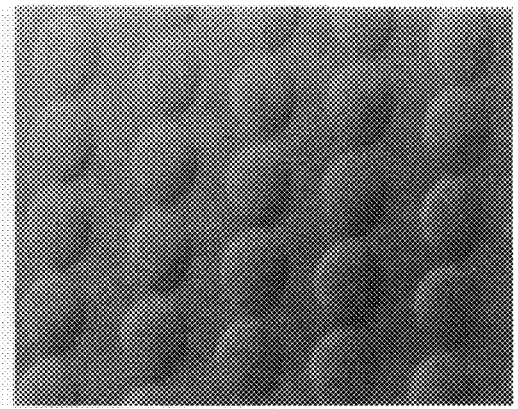

FIG. 3D shows the surface texture resulting from a pulse width $t_p$=60 microseconds. FIG. 3C shows the surface texture produced by a 33% increase in $t_p$ to 80 microseconds. The surface in FIG. 3C remains free of visible microcracks and debris. However, FIG. 3B shows extensive evidence of the micro-cracking that results with only an additional 12.5% increase in pulse width $t_p$ to 90 microseconds. It is this unexpectedly abrupt thermal-shock fluence threshold characteristic of brittle nonmetallic surfaces that motivated the refined fluence control element of the texturing process described herein. Finally, FIG. 3A shows the extensive surface damage and material ejection known in the art for laser-textured brittle nonmetallic surfaces. FIG. 3A is created by a pulse width $t_p$=150 microseconds, which is 250% of the value used for FIG. 3D.

Figure 4:
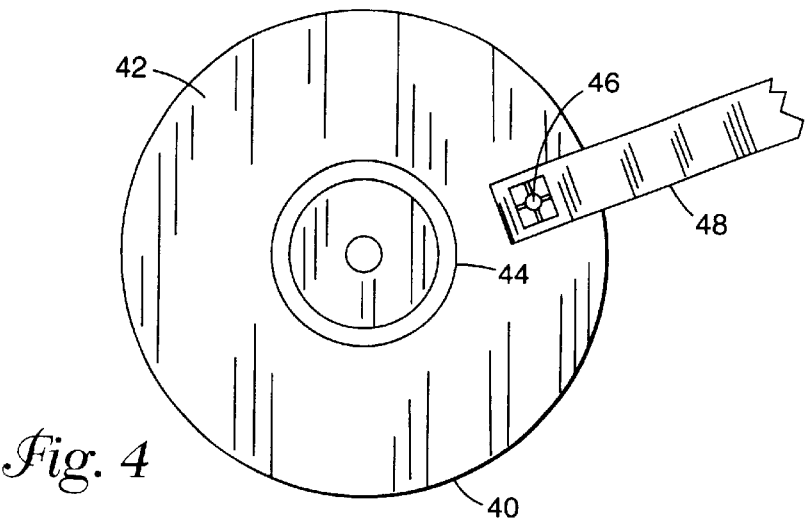
FIG. 4 is a plan view of a rotatable magnetic recording disk and magnetic head, including a Contact Start-Stop (CSS) region for contact between the magnetic head and recording disk.
Figure 5:
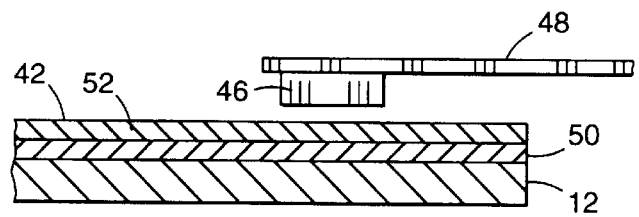
FIG. 5 is an enlarged sectional view of the magnetic disk of FIG. 4.

FIGS. 4 and 5 show a magnetic storage disk 40 having a specular outer surface 42 and a textured annular region 44 for use in Contact Start-Stop (CSS) cycling of the magnetic head 46. Magnetic head 46 is mounted on an arm 48, which is connected to means (not shown) for positioning head 46 in a generally radial direction with respect to rotating disk 40. In particular, head 46 is positioned over textured annular region 44 whenever the rotation of disk 40 is started or stopped.

Specular outer surface 42 of disk 40 (FIG. 5) may cover several layers of intervening materials. For instance, a glass substrate 12 may be formed and textured in accordance with the process of this invention before deposition of the subsequent magnetic recording layer 50 and protective layer 52. The topographical features of the textured surface of glass substrate 12 are reproduced at the surface of each subsequent layer deposited, thereby providing the desired texture in CSS region 44 on outer surface 42. Alternatively, any of the layers above glass substrate 12 may first be deposited and then textured in accordance with the method of this invention or any other useful method known in the art. Thus, "outer surface" 26 is used herein to denominate the surface of whichever of layers 12, 50 or 52 is modified topographically in accordance with the process of this invention. Ultimately, for data storage disk applications, the surface of protective layer 52 exhibits the desired texture in the CSS region provided by textured annular region 44.

The present invention may be employed to provide the glass substrate 12 with smoothly configured bumps wherein $D_d<D_s$ is in the interval 1–200 micrometers, $D_s>D_d$ is in the interval 1–500 micrometers and $h_d$ is in the interval 1–1000 nanometers.

Figure 6:
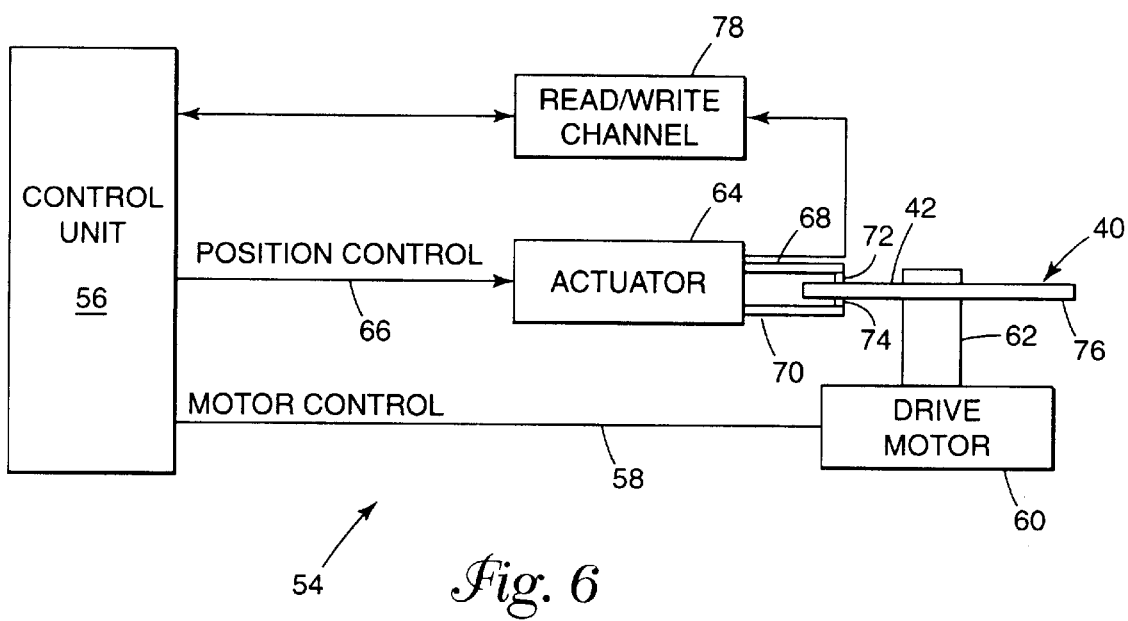
FIG. 6 is a functional block diagram of a Direct Access Storage Device (DASD) employing an embodiment of the textured recording disk of this invention.

FIG. 6 shows a functional block diagram of a Direct Access Storage Device (DASD) 54 employing the textured disk 40 having the glass substrate 12 of this invention. DASD 54 includes a control unit 56, which coordinates the operation of all elements with rotating disk 40. Control unit 56 provides a motor control signal 58 to a drive motor 60, which rotates disk 40 through a shaft 62. Control unit 56 also operates a head actuator 64 through a position control line 66. Actuator 64 is mechanically coupled through the two flexible members 68 and 70 to the two magnetic heads 72 and 74, respectively. Magnetic head 72 is disposed to read and write data on upper surface 42 of disk 40 and head 74 is similarly disposed to read and write data on the lower surface 76 of rotating disk 40. Heads 72 and 74 are coupled through a read/write channel 78 to control unit 56, whereby digital data is transferred to and from rotating disk 40.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawing.

We claim:

1. A magnetic recording disk having an outer surface with a nominal surface plane for storing magnetically-readable data, said disk comprising:
   a layer of glass substrate material having a substantially planar substrate surface; and
   a magnetizable film layer deposited over said glass substrate surface having a substantially uniform thickness and substantially planar surface which has a disk recording region and a disk contact start and stop (CSS) region for landing and take-off of a magnetic head;
   said substrate surface having a substrate CSS region below the disk CSS region;
      said substrate CSS region having a plurality of regularly-spaced-apart elevations, each said elevation having a diametral dimension $D_d$ in the interval from 1 to 100 micrometers and rising to a maximum height $h_d<100$ nanometer above said substrate surface; and
   each elevation being a smoothly shaped dome and free of surface cracks and material ejection.

2. The magnetic recording disk of claim 1 wherein said maximum height $h_d$ is in the interval from 3 to 40 nanometers.

3. The magnetic recording disk of claim 2 wherein said plurality of elevations are separated from one another by a center-to-center spacing distance $D_s>D_d$ having a value in the interval from greater than 1 to 500 micrometers.

4. The magnetic recording disk of claim 1 wherein said plurality of elevations are separated from one another by a center-to-center spacing distance $D_s>D_d$ having a value in the interval from greater than 1 to 500 micrometers.

5. The magnetic recording disk of claim 1 wherein each said spaced-apart elevation is separated from a nearest neighboring spaced-apart elevation by a center-to-center spacing distance $D_s$ substantially less than said maximum diametral dimension $D_d$, whereby a plurality of said elevations merge with their neighboring elevations to form a substantially continuous ridge on said substrate surface.

6. A Direct Access Storage Device (DASD) for reading and storing data, said DASD comprising:
   a magnetic recording disk having a layer of glass substrate material with a planar substrate surface underlying an outer planar recording surface with a substrate recording region and a substrate magnetic head contact start and stop (CSS) region of the substrate surface underlying a disk recording region and a disk magnetic head contact start and stop (CSS) region respectively of the recording surface;
   a magnetic head and means for supporting said head in a selected orientation and for generally radial controlled movement relative to said disk,
      both said substrate magnetic head CSS region and said disk magnetic head CSS region having a plurality of regularly-spaced-apart elevations, each said elevation having a diametral dimension $D_d$ in the interval from 1 to 100 micrometers and rising to a maximum height $h_d<100$ nanometers above each of the substrate surface and the recording surface; and
   each elevation being a smoothly shaped dome and free of surface cracks and material ejection.

7. The DASD of claim 6 wherein said maximum height $h_d$ is in the interval from 3 to 40 nanometers.

8. The DASD of claim 7 wherein said plurality of elevations are separated from one another by a center-to-center spacing distance $D_s>D_d$ having a value in the interval from greater than 1 to 500 micrometers.

9. The DASD of claim 6 wherein said plurality of elevations are separated from one another by a center-to-center spacing distance $D_s>D_d$ having a value in the interval from greater than 1 to 500 micrometers.

10. The DASD of claim 6 wherein each said spaced-apart elevation is separated from a nearest neighboring spaced-apart elevation by a center-to-center spacing distance $D_s$ substantially less than said maximum diametral dimension $D_d$, whereby a plurality of said elevations merge with their neighboring elevations to form a substantially continuous ridge on the substrate magnetic head CSS surface and the recording magnetic head CSS surface.

11. A magnetic recording disk as claimed in claim 1 wherein each elevation is made by at least one laser pulse which has an energy fluence level which is below a thermal shock energy fluence threshold level of the glass substrate so that each elevation is said smoothly shaped dome and is free of said surface cracks and material ejection.

12. A magnetic recording disk as claimed in claim 3 wherein each elevation is made by at least one laser pulse which has an energy fluence level which is below a thermal shock energy fluence threshold level of the glass substrate so that each elevation is said smoothly shaped dome and is free of said surface cracks and material ejection.

13. The DASD of claim 6 wherein each elevation is made by at least one laser pulse which has an energy fluence level which is below a thermal shock energy fluence threshold level of the glass substrate so that each elevation is said smoothly shaped dome and is free of said surface cracks and material ejection.

14. The DASD of claim 8 wherein each elevation is made by at least one laser pulse which has an energy fluence level which is below a thermal shock energy fluence threshold level of the glass substrate so that each elevation is said smoothly shaped dome and is free of said surface cracks and material ejection.

15. A magnetic disk comprising:

a glass substrate;

a magnetic layer;

the magnetic layer having a recording region and a magnetic head contact start and stop (CSS) region overlying a substrate recording region and substrate magnetic head contact start and stop (CSS) region respectively of the glass substrate;

the CSS region of the glass substrate having a plurality of spaced-apart dome-shaped bumps which are smoothly shaped and free from surface cracks and material ejection; and each bump having been made by at least one laser pulse which has an energy fluence which is below a thermal shock energy fluence threshold level of the glass substrate so that each bump has said smooth shape and is free of said surface cracks and material ejection.

16. A magnetic disk as claimed in claim 15 comprising:

a diametral dimension $D_d$ of the bump being less than a bump spacing $D_s$ and being in the interval 30 to 60 micrometers and a height $h_d$ of the bump being in the interval 3 to 100 nanometers.

17. A magnetic disk as claimed in claim 16 comprising:

the diametral dimension $D_d$ being substantially 60 micrometers and the height $h_d$ being substantially 100 nanometers.

18. A magnetic disk as claimed in claim 16 comprising:

the height $h_d$ being in the interval 3 to 40 nanometers.

19. A magnetic disk as claimed in claim 16 comprising:

the bump spacing $D_s$ being substantially 100 micrometers and the bump diametral dimension $D_d$ being substantially 30 micrometers.

20. A magnetic disk as claimed in claim 19 comprising:

the height $h_d$ being in the interval 3 to 40 nanometers.

21. A magnetic recording disk with reduced stiction comprising:

a glass substrate;

a magnetic layer covering said substrate and substantially replicating height variations in the glass substrate;

the glass substrate having a plurality of spaced-apart dome-shaped bumps which are smoothly shaped and free from surface cracks and material ejection; and each bump having been made by at least one laser pulse which has an energy fluence which is below a thermal shock energy fluence threshold level of the glass substrate so that each bump has said smooth shape and is free of said surface cracks and material ejection.

22. A magnetic recording disk as claimed in claim 21 including:

each bump having a height hd in the interval 1 to 150 nanometers.

23. A magnetic recording disk as claimed in claim 22 including:

each bump having a diametral dimension $D_d$ in the interval 30 to 60 micrometers and being less than a center-to-center bump spacing $D_s$.

24. A magnetic recording disk as claimed in claim 23 including:

a magnetic head recording region encompassing a portion of each of the substrate and the magnetic layer and a magnetic head contact start and stop (CSS) region encompassing another portion of each of the substrate and the magnetic layer; and said bumps being located only in said CSS region.

25. A magnetic recording disk as claimed in claim 21 including:

each bump having a height $h_d$ in the interval 5 to 40 nm.

26. A magnetic recording disk as claimed in claim 25 including:

each bump having a diametral dimension $D_d$ in the interval 30 to 60 micrometers and being less than a bump spacing $D_s$.

27. A magnetic recording disk as claimed in claim 26 including:

a magnetic head recording region encompassing a portion of each of the substrate and the magnetic layer and a magnetic head contact start and stop (CSS) region encompassing another portion of each of the substrate and the magnetic layer; and said bumps being located only in said CSS region.

28. A magnetic recording disk as claimed in claim 26 wherein said bump spacing $D_s$ is from greater than 1 to 500 micrometers.

29. A magnetic recording disk as claimed in claim 28 including:

a magnetic head recording region encompassing a portion of each of the substrate and the magnetic layer and a magnetic head contact start and stop (CSS) region encompassing another portion of each of the substrate and the magnetic layer; and said bumps being located only in said CSS region.

* * * * *

UNITED STATES PATENT AND TRADEMARK OFFICE
CERTIFICATE OF CORRECTION

PATENT NO. : 6,246,543 B1
DATED : June 12, 2001
INVENTOR(S) : Baumgart et al.

It is certified that error appears in the above-identified patent and that said Letters Patent is hereby corrected as shown below:

Column 5,
Lines 43 and 44, after "range of 1 to", delete "500 micrometers which is in the preferred range of 1 to".
Lines 47 and 48, after "1,000", delete "micrometers which is in the preferred range of 1 to 1,000".

Column 10,
Line 6, replace "hd" with -- $h_d$ --.

Signed and Sealed this

Twenty-ninth Day of October, 2002

Attest:

Attesting Officer

JAMES E. ROGAN
*Director of the United States Patent and Trademark Office*